(12) United States Patent
Kim et al.

(10) Patent No.: US 8,508,915 B2
(45) Date of Patent: Aug. 13, 2013

(54) MULTILAYER CERAMIC CONDENSER AND METHOD OF MANUFACTURING THE SAME

(75) Inventors: Hyung Joon Kim, Gyunggi-do (KR); Jong Hoon Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 21 days.

(21) Appl. No.: 13/276,752

(22) Filed: Oct. 19, 2011

(65) Prior Publication Data
US 2012/0147522 A1    Jun. 14, 2012

(30) Foreign Application Priority Data
Dec. 13, 2010  (KR) .................. 10-2010-0126973

(51) Int. Cl.
*H01G 4/06* (2006.01)
(52) U.S. Cl.
USPC .............. 361/321.2; 361/321.1; 361/306.1; 361/306.3; 361/313; 361/305
(58) Field of Classification Search
USPC ............ 361/321.1, 321.2, 303, 305, 301.2, 361/301.4, 311–313, 306.1, 306.3
See application file for complete search history.

(56) References Cited

U.S. PATENT DOCUMENTS

| | | | |
|---|---|---|---|
| 4,771,520 A | 9/1988 | Tanaka et al. | |
| 6,362,947 B1* | 3/2002 | Chazono | 361/306.3 |
| 6,839,221 B2* | 1/2005 | Sugimoto et al. | 361/321.2 |
| 6,934,145 B2* | 8/2005 | Hsieh et al. | 361/321.2 |
| 7,495,883 B2* | 2/2009 | Nishikawa et al. | 361/305 |
| 8,264,815 B2* | 9/2012 | Yun et al. | 361/311 |
| 8,390,983 B2* | 3/2013 | Jeong et al. | 361/311 |
| 8,395,882 B2* | 3/2013 | Suzuki et al. | 361/321.5 |

FOREIGN PATENT DOCUMENTS

| | | |
|---|---|---|
| JP | 62-237714 | 10/1987 |
| JP | 03-108306 A | 5/1991 |
| JP | 05-175073 | 7/1993 |
| JP | 06-318531 | 11/1994 |
| JP | 07-297074 | 11/1995 |
| JP | 2003-257780 | 9/2003 |
| JP | 2009-032833 A | 2/2009 |
| JP | 2010-153720 | 7/2010 |
| KR | 10-2006-0026933 A | 3/2006 |

OTHER PUBLICATIONS

Korean Office Action, w/ English translation thereof, issued in Korean Patent Application No. 10-2010-0126973, dated Feb. 2, 2012.
Office Action issued in Japanese Patent Application No. 2011-246173 dated Feb. 19, 2013.

* cited by examiner

*Primary Examiner* — Nguyen T Ha
(74) *Attorney, Agent, or Firm* — McDermott Will & Emery LLP (57) ABSTRACT

Disclosed are a multilayer ceramic condenser and a method of manufacturing a multilayer ceramic condenser. There is provided a method of manufacturing a multilayer ceramic condenser, including: printing a plurality of stripe-type inner electrode patterns on a ceramic green sheet in parallel; forming a laminate by stacking ceramic green sheets on which a plurality of stripe-type inner electrode patterns are formed; cutting the laminate so that a first inner electrode pattern and a second inner electrode pattern are alternately stacked; and forming a first side part and a second side part by applying ceramic slurry in order to cover the side of the laminate to which both the first inner electrode pattern and the second inner electrode pattern are exposed.

11 Claims, 6 Drawing Sheets

MULTILAYER CERAMIC CONDENSER AND METHOD OF MANUFACTURING THE SAME

CROSS-REFERENCE TO RELATED APPLICATIONS

This application claims the priority of Korean Patent Application No. 10-2010-0126973 filed on Dec. 13, 2010, in the Korean Intellectual Property Office, the disclosure of which is incorporated herein by reference.

BACKGROUND OF THE INVENTION

1. Field of the Invention

The present invention relates to a multilayer ceramic condenser and a method of manufacturing the same, and more particularly, to a miniaturized and high-integrated multilayer ceramic condenser and a method of manufacturing the same.

2. Description of the Related Art

A multilayer ceramic condenser (MLCC), a device capable of storing electricity, stores electricity in each electrode by applying voltage to opposing electrodes. When DC voltage is applied to the condenser, current flows in the condenser while electricity is stored therein; however, but when the storage of electricity is completed, current does not flow in the condenser. Meanwhile, when AC voltage is applied to the condenser, AC current continuously flows in the condenser while the polarity of the electrode is alternated.

Depending on a type of an insulator provided between electrodes, the condenser may be classified as one of an aluminum electrolytic condenser, in which electrodes are made of aluminum and a thin oxide layer is provided between the aluminum electrodes, a tantalum electrolytic condenser using tantalum as an electrode material, a ceramic condenser using a high-K dielectric such as barium titanate between electrodes, a multi layer ceramic condenser (MLCC) using a multilayer structure made of a high-K ceramic as a dielectric provided between electrodes, a film condenser using a polystyrene film as a dielectric between electrodes, or the like.

Among these, the multilayer ceramic condenser may be miniaturized while having excellent heat resistance and frequency characteristics, such that it has been commonly used for various applications, such as a high frequency circuit, or the like.

In the multilayer ceramic condenser according to the related art, a laminate may be formed by stacking a plurality of dielectric sheets, external electrodes having different polarities may be formed on the outside of the laminate, and inner electrodes, alternately stacked within the laminate, may be electrically connected to each outer electrode.

The inner electrodes alternately formed between the dielectric sheets are opposed and paired with one another such that polarity exists therebetween to generate capacitance coupling, such that the multilayer ceramic condenser has a capacitance value.

Recently, as electronic products have become miniaturized and highly integrated, research into miniaturizing and highly integrating the multilayer ceramic condenser has been conducted. In particular, various attempts to improve connectivity between inner electrodes while thinning and highly stacking dielectric layers, in order to implement a high-capacity small-sized multilayer ceramic condenser, have been conducted.

SUMMARY OF THE INVENTION

An aspect of the present invention provides a multilayer ceramic condenser capable of securing the thickness uniformity of dielectric layers even in a thin layer in order to highly stack and miniaturize the multilayer ceramic condenser and removing steps of the dielectric layers in order to improve an accelerated life of insulation resistance, and a method of manufacturing the same.

According to an aspect of the present invention, there is provided a method of manufacturing a multilayer ceramic condenser, including: preparing a plurality of first ceramic green sheets on which a plurality of first stripe-type inner electrode patterns are printed in parallel and a plurality of second ceramic green sheets in which a plurality of second stripe-type inner electrode patterns are printed in parallel; forming a laminate by alternately stacking the first green sheets and the second green sheets so that the plurality of first stripe-type inner electrode patterns and the plurality of second stripe-type inner electrode patterns are alternately stacked; cutting the laminate into a bar-type laminate to traverse the plurality of first and second stripe-type inner electrode patterns in order to form a second side and a fourth side; and forming a first side part and a second side part by applying ceramic slurry in order to cover the second side and the fourth side.

The forming of the laminate may include forming the laminate so that central portions of the first or second stripe-type inner electrode patterns and gap portions formed between the plurality of second or first stripe-type inner electrode patterns disposed on adjacent ceramic green sheets are disposed on a straight line.

The method of manufacturing a multilayer ceramic condenser may further include forming a plurality of multilayer main bodies further including a first side and a third side by cutting the bar-type laminate in order to include the central portions of the first or second stripe-type inner electrode patterns and the gap portions formed between the plurality of second or first stripe-type inner electrode patterns disposed on adjacent ceramic green sheets before or after the first side part and the second side part are formed.

The method of manufacturing a multilayer ceramic condenser may further include forming a first outer electrode and a second outer electrode on each of the first side and the third side of the multilayer main body.

According to another aspect of the present invention, there is provided a multilayer ceramic condenser, including: a multilayer main body in which a plurality of dielectric layers are stacked; a first outer electrode and a second outer electrode each formed on a first side and a third side facing each other of the multilayer main body; a first inner electrode pattern exposed to the first side and formed in the multilayer main body to cover a dielectric layer at a predetermined interval from the third side; a second inner electrode pattern formed in the multilayer main body to be alternately stacked with the first inner electrode pattern, having at least one dielectric layer disposed therebetween and exposed to the third side in order to cover the dielectric layer at a predetermined interval from the first side; and a first side part and a second side part formed by applying ceramic slurry to each of the second side and fourth side facing each other to which the first inner electrode pattern and the second inner electrode pattern are exposed, in the laminate.

If a height of the multilayer main body is h1 and a height of a portion in which a step is formed due to the first and second inner electrode patterns formed in the multilayer main body is h2, the h1 and h2 may meet the following Equation 1.

$$(h1-h2)/h1 \leq 0.15 \quad \text{Equation 1}$$

The thickness of the first side part and the second side part may be controlled by controlling the amount of ceramic slurry.

The first inner electrode pattern and the second inner electrode pattern may be spaced apart from each other from the third side and the first side by an insulating distance.

The first inner electrode pattern and the second inner electrode pattern may be each spaced apart from each other by an interval of 20 μm or more from the third side and the first side.

The area of the first inner electrode pattern or the second inner electrode pattern may be 90% or more as compared to the area of the dielectric layer.

The overlapping area between the first inner electrode pattern and the second inner electrode pattern may be 80% or more as compared to the area of the dielectric layer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will be described in detail with reference to the accompanying drawings. However, in describing the exemplary embodiments of the present invention, detailed descriptions of well-known functions or constructions will be omitted so as not to obscure the description of the present invention with unnecessary detail.

The same reference numerals will be used throughout to designate the same or like elements in the accompanying drawings.

In addition, unless explicitly described to the contrary, the word "include" and variations such as "includes" or "including," will be understood to imply the inclusion of stated elements but not the exclusion of any other elements.

Hereinafter, a multilayer ceramic condenser and a method of manufacturing the same according to an exemplary embodiment of the present invention will be described with reference to FIGS. 1 to 6.

Figure 1:
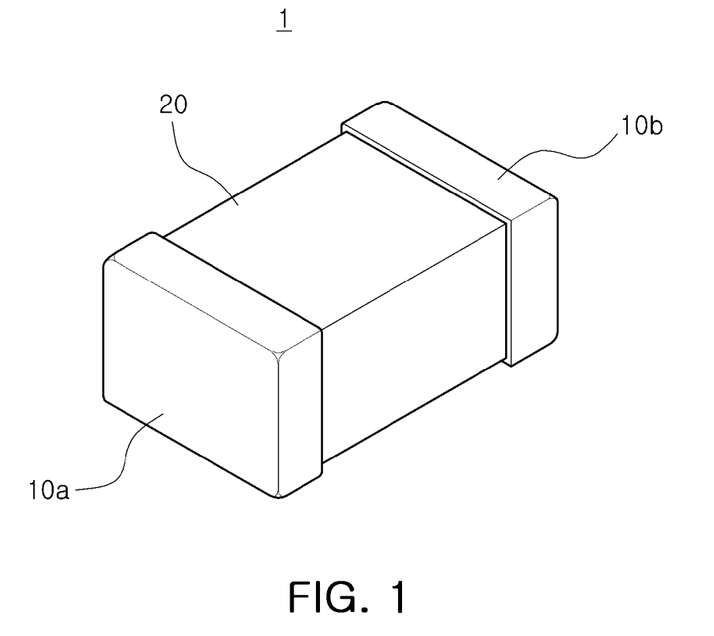
FIG. 1 is a perspective view of a multilayer ceramic condenser according to an exemplary embodiment of the present invention.
Figure 2A:
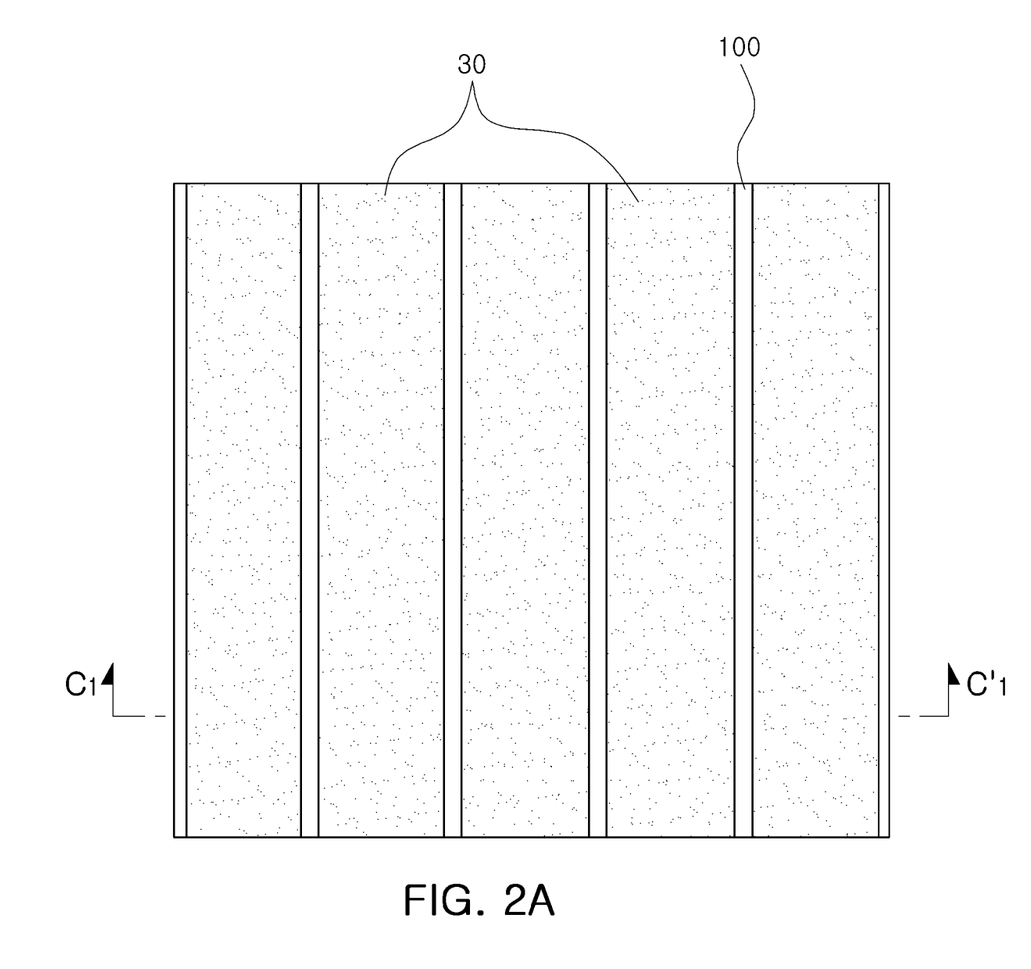
FIGS. 2A and 2B are a plan view and a front view showing a dielectric sheet printed with stripe-type inner electrode patterns according to the exemplary embodiment of the present invention.
Figure 2B:
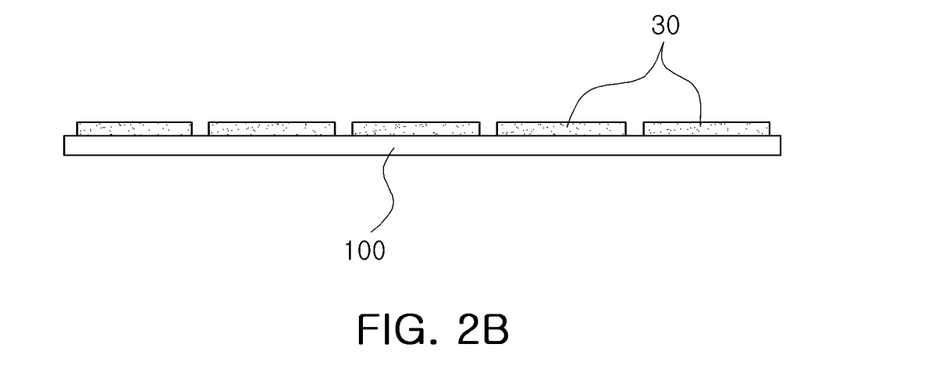
Figure 3:
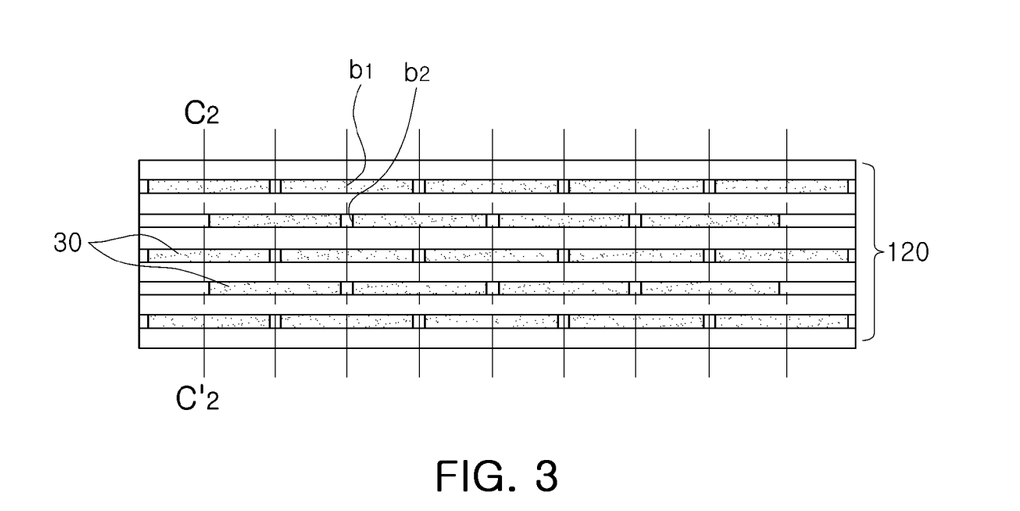
FIG. 3 is a cross-sectional view showing a laminate in which a plurality of dielectric sheets are stacked according to the exemplary embodiment of the present invention.
Figure 4A:
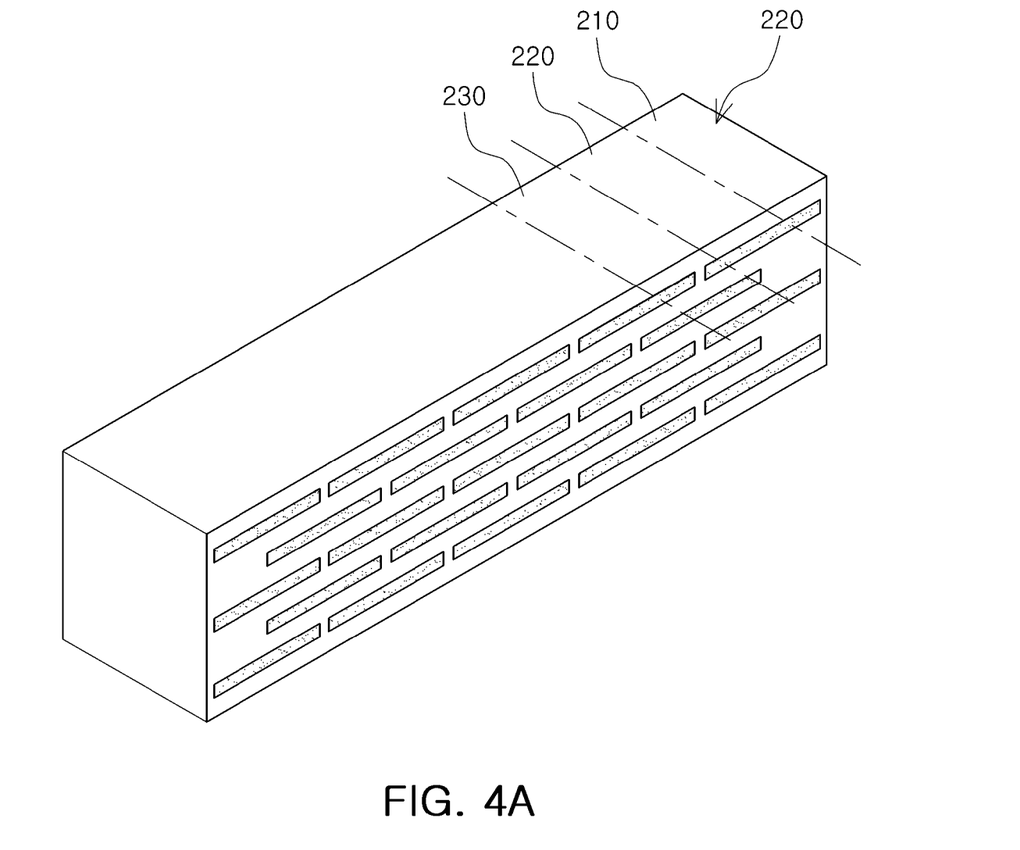
FIG. 4A is a perspective view showing a bar-type laminate according to the exemplary embodiment of the present invention.
Figure 4B:
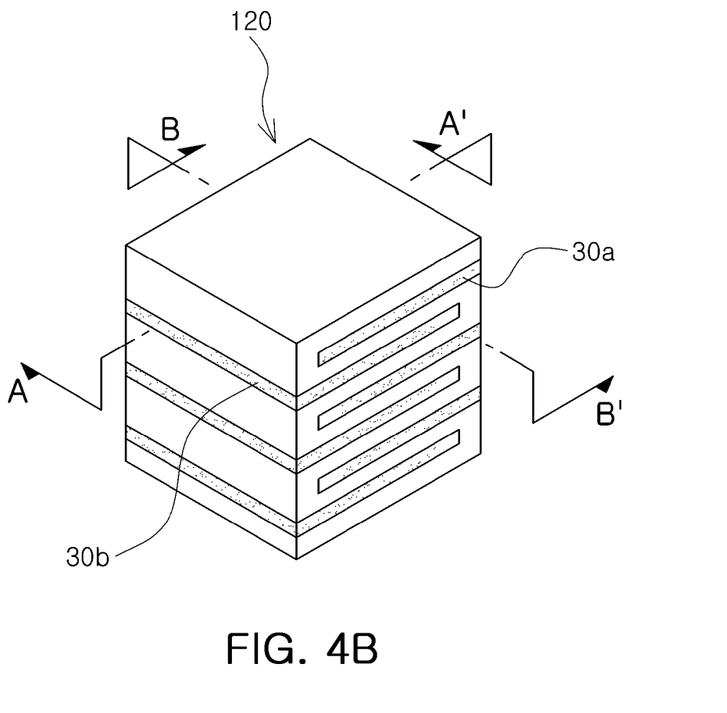
FIG. 4B is a perspective view showing a multilayer main body according to the exemplary embodiment of the present invention.
Figure 5A:
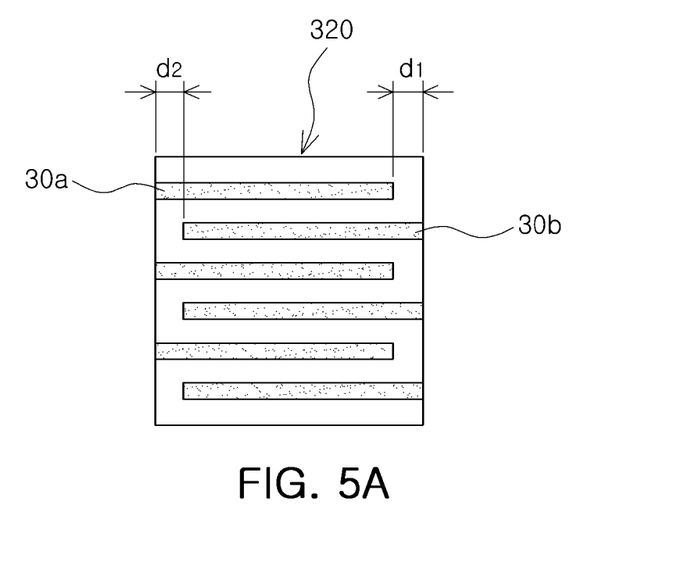
FIG. 5A is a cross-sectional view taken along line A-A' of the multilayer main body shown in FIG. 4B.
Figure 5B:
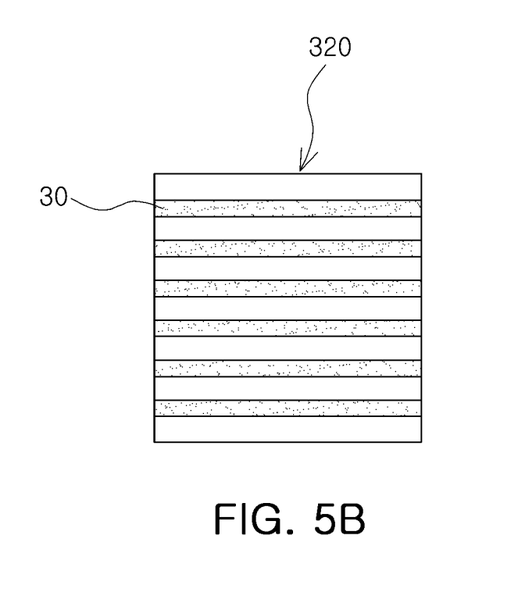
FIG. 5B is a cross-sectional view taken along line B-B' of the multilayer main body shown in FIG. 4B.
Figure 6:
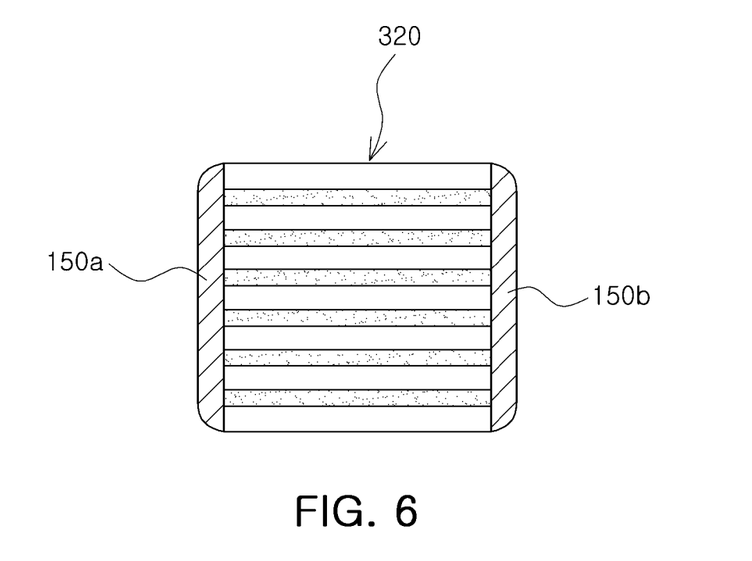
FIG. 6 is a cross-sectional view of the multilayer main body formed to have side parts according to the exemplary embodiment of the present invention.

FIG. 1 is a perspective view of a multilayer ceramic condenser according to an exemplary embodiment of the present invention, FIGS. 2A and 2B are a plan view and a front view showing a dielectric sheet printed with stripe-type inner electrode patterns according to the exemplary embodiment of the present invention, FIG. 3 is a cross-sectional view showing a laminate in which a plurality of dielectric sheets are stacked according to the exemplary embodiment of the present invention, FIG. 4A is a perspective view showing a bar-type laminate according to the exemplary embodiment of the present invention, FIG. 4B is a perspective view showing a multilayer main body according to the exemplary embodiment of the present invention, FIG. 5A is a cross-sectional view taken along line A-A' of the multilayer main body shown in FIG. 4B, FIG. 5B is a cross-sectional view taken along line B-B' of the multilayer main body shown in FIG. 4B, and FIG. 6 is a cross-sectional view taken along the multilayer main body formed to have side parts according to the exemplary embodiment of the present invention.

Referring to FIG. 1 showing a perspective view of a multilayer ceramic condenser according to an exemplary embodiment of the present invention, a multilayer ceramic condenser 1 according to an exemplary embodiment of the present invention may be configured to include a multilayer main body 20 in which a plurality of dielectric layers are stacked, a first outer electrode 10a, a second outer electrode 10b, a first inner electrode, and a second inner electrode.

The plurality of dielectric layers are stacked to form the ceramic multilayer main body. The first dielectric layer may be provided with a first inner electrode pattern and the second dielectric layer may be provided with a second inner electrode pattern. The first dielectric layer and the second dielectric layer are alternately stacked so that they may be disposed to have an overlapping area therebetween, while being exposed to different surfaces.

Further, the dielectric layer may be manufactured as a ceramic green sheet having a predetermined dielectric constant.

The first outer electrode 10a may be formed on one end surface of the multilayer main body 20 and may be formed to be electrically connected to the first inner electrode pattern. Further, the second outer electrode 10b may be formed on the other end surface of the multilayer main body 20 and may be formed to be electrically connected to the second inner electrode pattern.

The first outer electrode 10a and the second outer electrode 10b may be made of a metallic material having excellent conductivity such as nickel (Ni), silver (Ag), palladium (Pd), or the like and may serve to connect the multilayer ceramic condenser with external devices.

As the multilayer main body 20 is highly stacked, the steps of the dielectric layers therein become a significant factor and the inner electrode patterns must be thinned. Therefore, a phenomenon in which the inner electrode pattern is short-circuited may frequently occur.

However, according to the exemplary embodiment of the present invention, even though the inner electrode pattern and the dielectric layer are formed to be thin, the inner electrode pattern is formed to cover the majority of the dielectric layer, such that the connectivity between the first inner electrode pattern and the second inner electrode pattern formed in the multilayer main body 20 is excellent and the overlapping area therebetween is increased, thereby increasing the capacitance of the multilayer ceramic condenser.

Further, the exemplary embodiment of the present invention reduces the steps of the dielectric layers configuring the multilayer main body 20, the first inner electrode pattern, and the second inner electrode pattern to improve the accelerated life of insulation resistance, thereby providing the multilayer ceramic condenser with excellent capacity characteristics and the improved reliability.

Hereinafter, a method of manufacturing a multilayer ceramic condenser in which the plurality of dielectric layers having small steps, according to the exemplary embodiment of the present invention are stacked, will now be described.

FIGS. 2A and 2B are diagrams showing a ceramic green sheet 100 printed with stripe-type inner electrode patterns 30 according to the exemplary embodiment of the present invention.

Referring to FIG. 2A, in order to manufacture a multilayer ceramic condenser according to the exemplary embodiment of the present invention, a plurality of stripe-type inner electrode patterns 30 are printed on a ceramic green sheet 100. The ceramic green sheet 100 may be formed by applying and drying a ceramic paste including a ceramic powder, an organic solvent, and an organic binder.

The ceramic powder may be a high-K material, but is not limited thereto. Therefore, a barium titanate (BaTiO3)-based material, a lead complex Perovskite-based material, a strontium titanate (SrTiO3)-based material, or the like, may be used, preferably, a barium titanate (BaTiO3)-based powder may be used.

The organic binder may be used to secure the dispersibility of the ceramic powder, but is not limited thereto. Accordingly, as the organic binder, ethyl cellulose, polyvinyl butyral, and a mixture thereof may be used.

The stripe-type inner electrode 30 may be made of a material having excellent electrical conductivity, including a conductive metal according to the exemplary embodiment of the present invention. Further, the conductive metal is not limited thereto, but may include at least one selected from a group consisting of Ni, Cu, Pd, and an alloy thereof.

The stripe-type inner electrode 30 is formed by printing the inner electrode paste including the conductive metal on the ceramic green sheet 100, but is not limited thereto. As a result, the stripe-type inner electrode 30 may be printed on the ceramic green sheet by a screen printing method, a gravure printing method, or the like.

The exemplary embodiment of the present invention may prepare a first ceramic green sheet printed with a first stripe-type inner electrode and a second ceramic green sheet printed with a plurality of second stripe-type inner electrode patterns.

The first ceramic green sheet and the second ceramic green sheet may be alternately stacked. In particular, the first stripe-type inner electrode pattern and the second stripe-type inner electrode pattern may be alternately stacked.

In addition, a laminate in which the plurality of first ceramic green sheets and the plurality of second green sheets are alternately stacked is later cut, such that the first stripe-type inner electrode pattern may form a first inner electrode pattern and the second stripe-type inner electrode pattern may form a second inner electrode pattern.

Referring to FIG. 2B, the plurality of stripe-type inner electrode patterns 30 are printed on the ceramic green sheet 100 in a parallel stripe shape. Adjacent stripe-type inner electrode patterns 30 printed on the same ceramic green sheet 100 may be printed to be spaced apart from each other at predetermined intervals.

FIG. 3 is a cross-sectional view showing the laminate in which the plurality of ceramic green sheets printed with first and second stripe-type inner electrode patterns 30A and 30B according to the exemplary embodiment of the present invention are stacked.

Referring to FIG. 3, a laminate 120 is formed by alternately stacking the first ceramic green sheet printed with the plurality of parallel first stripe-type inner electrode patterns 30A and the second ceramic green sheet printed with the plurality of parallel second stripe-type inner electrode patterns 30B.

In particular, the plurality of first stripe-type inner electrode patterns 30A and the plurality of second stripe-type inner electrode patterns 30B may be alternately stacked.

The laminate 120 is cut into unit chips to be separated into a plurality of chips and the first stripe-type inner electrode pattern 30A may form the first inner electrode pattern 30a shown in FIG. 5A and the second stripe-type inner electrode pattern 30B may form the second inner electrode pattern 30b shown in FIG. 5A.

Alternately stacking the ceramic green sheets implies that the central portions of the first or second stripe-type inner electrode patterns printed on one ceramic green sheet 100 and gap portions between the plurality of first or second stripe-type inner electrode patterns printed on adjacent ceramic green sheets are aligned on a common axis.

According to the exemplary embodiment of the present invention, it can be appreciated from FIG. 3 that a central portion b1 of the first stripe-type inner electrode pattern 30A and a gap portion b2 between the second stripe-type inner electrode patterns 30B are alternately disposed to be aligned on a common axis.

Therefore, the laminate 120, in which the plurality of first and second stripe-type inner electrode patterns 30 disposed on the ceramic green sheets 100 adjacent to each other are alternately stacked, has a plan view as shown in FIG. 2A.

The laminate 120 may be cut into a bar-type laminate 220 (FIG. 4A) along line C1-C1'. The laminate 120 may be cut to traverse the plurality of stripe-type inner electrode patterns 30 and may be cut into a plurality of bar-type laminates 220 as shown in FIG. 4A.

Thereafter, the bar-type laminate 220 of FIG. 4A is cut to coincide with the individual chip size along line C2-C2' shown in FIG. 3, thereby forming a plurality of multilayer main bodies 320 (FIG. 5B).

In particular, when the bar-type laminate 220 is cut along line C2-C2', it may be cut in order to coincide the central portions of the first or second stripe-type inner electrode patterns with the gap portions of the second or the first stripe-type inner electrode patterns. Therefore, the plurality of multilayer main bodies 320 have a structure in which the first inner electrode pattern formed by cutting the first stripe-type inner electrode pattern and the second inner electrode pattern formed by cutting the second stripe-type inner electrode pattern are alternately stacked.

The cutting line C1-C1' is formed to alternately include the central portion b1 of the first or second stripe-type inner electrode patterns and the gap portion b2 of the second or first stripe-type inner electrode patterns, such that the cutting surface of the multilayer main body 320 has a structure in which the gap portions between the first or second inner electrode patterns and the second or first inner electrode patterns are alternately formed. That is, one surface of the bar-type laminate 220 is formed to draw out the first inner electrode pattern 30a and the other surface thereof is formed to draw out the second inner electrode pattern 30b.

Referring to FIG. 4B, the cut multilayer main body 320 has a first side and a third side on which the first inner electrode pattern 30a and the second inner electrode pattern 30b are respectively exposed in direction A-A', wherein the first side and the third side of the multilayer main body 320 are formed by being cut along line C2-C2' and are disposed to face each other.

In addition, the multilayer main body 320 has a second side and a fourth side to which both the first inner electrode pattern 30a and the second inner electrode pattern 30b are exposed in direction B-B', wherein the second side and the fourth side of the multilayer main body 320 are formed by being cut along line C1-C1' and are disposed to face each other.

FIG. 5A is a diagram showing a cross section of the multilayer main body 320 taken along line A-A'.

Referring to FIG. 5A, the multilayer main body 320 is formed by stacking the plurality of dielectric layers.

The inside of the multilayer main body 320 has the first inner electrode pattern 30a and the second inner electrode pattern 30b alternately stacked therein, having at least one dielectric layer disposed therebetween. The individual opposed electrodes of the first inner electrode pattern 30a and the second inner electrode pattern 30b are each formed to be respectively exposed to the first side and the third side and are formed to have an overlapping area and at least one dielectric layer disposed therebetween.

The first side of the multilayer main body 320 may be provided with the first outer electrode electrically connected with the first inner electrode pattern 30a and the third side of the multilayer main body 320 may be provided with the second outer electrode electrically connected with the second inner electrode pattern 30b.

In particular, individual electrodes of the first inner electrode pattern 30a may be formed to entirely cover individual dielectric layers up to a predetermined interval inward of the third side formed with the second outer electrode thereon, in order to be insulated from the second outer electrode. Individual electrodes of the first inner electrode pattern 30a may be formed to be spaced apart from the third side by a distance corresponding to an insulating distance d1 sufficient to maintain electrical insulation from the second outer electrode, and may preferably be formed to be spaced apart from the third side by an interval of a minimum of 20 μm or more.

Similarly, individual electrodes of the second inner electrode pattern 30b may be formed to entirely cover individual dielectric layers up to a predetermined interval inward of the first side formed with the first outer electrode thereon, in order to be insulated from the first outer electrode and may be spaced apart from the first side by a distance corresponding to an insulating distance d2 sufficient enough to maintain electrical insulation from the first outer electrode, and may be formed to be spaced apart from the first side by an interval of a minimum of 20 μm or more.

FIG. 5B is a diagram showing a cross section taken along line B-B' of the multilayer main body 320 shown in FIG. 4B.

Referring to FIG. 5B, the multilayer main body 320 is formed by stacking the plurality of dielectric layers. The inside of the multilayer main body 320 is provided with the plurality of opposing individual electrodes of the inner electrode patterns 30, having at least one dielectric layer disposed therebetween.

According to the exemplary embodiment of the present invention, the plurality of dielectric layers do not form steps, since the inner electrodes 30 are formed to cover the entirety of individual dielectric layers other than in the minimum area thereof in which individual inner electrodes 30 maintain the minimum possible electrical insulation.

Therefore, even though the plurality of thin dielectric layers are formed, each dielectric layer almost entirely lacks steps, such that the thickness of each individual dielectric layer may be uniform. That is, the thickness of the plurality of dielectric layers may be approximately similar in the multilayer main body 320 and all of the multilayer main bodies 320 may have a uniform thickness in the top portion, the bottom portion, and the central portion thereof in a stacking direction in which stacking and compressing are carried out.

According to the exemplary embodiment of the present invention, the height of the dielectric layer may be several micrometers, and the inner electrode pattern may be printed on the dielectric layer at a thickness of 1 to 5 μm. When the dielectric layers are stacked in an amount of several hundred layers, the stacking thickness of dielectric layer portions on which the inner electrode pattern is not printed may be thinner than that of dielectric layer portions on which the inner electrode pattern is printed, such that the dielectric layer has a sunken structure due to the formed steps.

However, according to the exemplary embodiment of the present invention, the inner electrode pattern is formed to maximally cover the dielectric layers, such that only a small step may be formed.

In more detail, if the height of the multilayer main body 320 is h1 and the height of the portion in which the step is formed due to the first and second inner electrode patterns formed in the multilayer main body is h2, then h1 and h2 may meet the following Equation 1.

$$(h1-h2)/h1 \leq 0.15$$ Equation 1

Further, the first inner electrode pattern 30a and the second inner electrode pattern 30b may be formed over a maximally wide area of dielectric layers, such that the overlapping area therebetween may be increased.

That is, according to the exemplary embodiment of the present invention, since the inner electrode pattern is formed on the entirety of individual dielectric layers with the exception of the minimum area necessary in order to secure the insulation from an opposing electrode, the area of a dielectric layer occupied by individual electrodes of the first inner electrode pattern 30a or the second inner electrode pattern may be 90% or more.

Therefore, the overlapping area between opposing individual electrodes of the first electrode pattern 30a and second inner electrode pattern 30b may be 80% or more. As the overlapping area is increased, high capacitance can be secured.

FIG. 6 is a cross-sectional view showing a process of forming side parts 150a and 150b on the multilayer main body 320 according to the exemplary embodiment of the present invention.

Referring to FIG. 6, according to the exemplary embodiment of the present invention shown in FIG. 5B, the multilayer main body 320 in which the plurality of dielectric layers having the uniform thickness are stacked without almost having the steps may be formed.

However, referring to FIG. 4B, in the case of the multilayer main body 320, according to the exemplary embodiment of the present invention, the outer electrode is formed in direction A-A', such that the plurality of dielectric layers and the inner electrode patterns are not exposed to the outside. However, the inner electrode patterns are exposed to the outside in direction B-B', such that the inner electrode patterns may be physically damaged, thereby having a negative effect on products.

Therefore, according to the exemplary embodiment of the present invention, the second side and the fourth side formed in direction B-B' of the multilayer main body 320 may be provided with the side parts 150a and 150b.

The side parts 150a and 150b may be provided on the second side and the fourth side, wherein the second side and the fourth side are formed by being cut along line C1-C1', such that they may be formed on the bar-type laminate 220 of FIG. 4A or on the second side and the fourth side of the multilayer main body of FIG. 4B.

The side part may be formed on the side formed with the major axis corresponding to the second side and the fourth side of the bar-type laminate 220 of FIG. 4A and the side parts of the plurality of multilayer main bodies 320 may be formed through a one-time process by using the bar-type laminate 220.

In other words, the first side part and the second side part may be cut to form the multilayer main body 320 along line C2-C2' before or after first side part and the second side part are formed thereon. The first side part and the second side part may be cut to form the plurality of multilayer main bodies 320 after first side part and the second side part are formed thereon.

The side parts 150a and 150b are formed on the second side and the fourth side of the bar-type laminate 220 or on the multilayer main body 320, and may be respectively formed by applying dielectric slurry including a ceramic powder including ceramic to the first and fourth sides.

The side parts 150a and 150b are formed by applying the ceramic slurry composed of the ceramic powder, the organic binder, and the organic solvent, and the amount of slurry in each side part 150a and 150b can be controlled in order to form a desired thickness therein.

After the multilayer main body 320 having the side parts 150a and 150b is formed, the surfaces exposed in direction A-A' are provided with the first outer electrode and the second outer electrode, such that the multilayer ceramic condenser is completed.

Referring to FIG. 1, the multilayer ceramic condenser 1 manufactured according to the exemplary embodiment of the present invention includes the multilayer main body 20 in which the plurality of dielectric layers are stacked, the first external electrode 10a formed on one end surface of the multilayer main body, and the second external electrode 10b formed on the other end surface of the first outer electrode 10a.

Referring to FIG. 5A, the multilayer main body 20 includes the first inner electrode pattern 30a and the second inner electrode pattern 30b formed between the plurality of dielectric layers, wherein the first inner electrode patterns 30a and the second inner electrode pattern 30b are alternately stacked and are disposed to have the overlapping area, opposing each other.

The capacity of the multilayer ceramic condenser may be determined according to the overlapping area thereof. That is, as the overlapping area is increased, the capacity of the multilayer ceramic condenser may also be increased.

In addition, the first outer electrode 10a and the second outer electrode 10b may each be formed to be connected with the first inner electrode pattern 30a and the second inner electrode pattern 30b.

In the case of the multilayer ceramic condenser 1 manufactured according to the exemplary embodiment of the present invention, individual electrodes of the first inner electrode pattern 30a are formed to cover the entirety of individual dielectric layers, other than portions thereof adjacent to the electrically insulated second outer electrode, while being electrically connected with the first outer electrode. In addition, individual electrodes of the second inner electrode pattern 30b are formed to cover the entirety of individual dielectric layers other than portions thereof adjacent to the electrically insulated first outer electrode while being electrically connected with the second outer electrode.

Therefore, individual electrodes of the first inner electrode pattern or the second inner electrode pattern may be formed on the maximally large area of the dielectric layer. According to the exemplary embodiment of the present invention, the first inner electrode pattern or the second inner electrode pattern may be formed in the area equal to 90% or more of the area of the dielectric layer and the area in which the first inner electrode pattern and the second electrode pattern overlap with each other may be 80% or more of the area of the dielectric layers. Therefore, as the area of the inner electrode pattern is increased, it is advantageous in securing capacity.

Further, as the area covered by the inner electrode pattern is increased, it may prevent dielectric layer steps from being formed and thus, it is possible to reduce the thickness deviations of the plurality of dielectric layers.

In the case of the multilayer ceramic condenser 1 manufactured according to the exemplary embodiment of the present invention, as the inner electrode pattern is formed to cover the majority of the dielectric layer, the step of the dielectric layer is small when being stacked and a dielectric layer having a uniform thickness may be formed even in the case it is thinly formed.

According to the exemplary embodiment of the present invention, the inner electrode pattern is formed to cover the dielectric layer, such that the first side part and the second side part formed by applying the ceramic slurry to each side to which the first inner electrode pattern and the second inner electrode patterns are exposed may be formed.

Accordingly, the multilayer ceramic condenser stacked with dielectric layers having uniform thicknesses can be manufactured and the multilayer ceramic condenser formed with the first side part and the second side part having a predetermined thickness can be manufactured.

According to the exemplary embodiment of the present invention, the thickness of the dielectric layers is uniform and the thickness deviations therein are very small, such that the durability of the multilayer ceramic condenser is excellent, thereby improving the high-temperature accelerated life thereof.

Further, according to the exemplary embodiment of the present invention, the thickness of the dielectric layers is uniform and the thickness deviations therein are very small, even in the case the dielectric layers are formed to be thin, such that occurrence of short circuits and the electrical connectivity of the inner electrode pattern formed between the dielectric layers can be excellent. Accordingly, the reliability of products may be improved.

According to the exemplary embodiment of the present invention, the inner electrode pattern is formed to cover the dielectric layer to sufficiently secure an area in which the first inner electrode pattern and the second inner electrode pattern overlap with each other, thereby improving the capacity of products. The side part can be controlled to have the desired thickness through the additional process, such that the flexibility of product design is improved.

In addition, the exemplary embodiment of the present invention is cut into the bar-type laminate by using the stripe-type inner electrode pattern and is then cut into a chip unit, such that the products can be mass-produced, thereby reducing the manufacturing costs of products.

As set forth above, through the method of manufacturing a multilayer ceramic condenser according to the exemplary embodiment of the present invention, a plurality of multilayer ceramic condensers can be mass-produced by printing the stripe-type inner electrode patterns. The inner electrode patterns are formed to cover the dielectric layers when the thin inner electrode patterns and the ceramic green sheets are stacked in order to secure the connectivity of the inner electrode patterns even in the case that the inner electrode patterns are formed to be thin and the inner electrode patterns occupy a large area of the dielectric layers in order to secure the capacity of the multilayer ceramic condenser.

In addition, the inner electrode patterns of the multilayer ceramic condenser according to the exemplary embodiment of the present invention are formed in order to cover individual dielectric layers so to secure the largest possible overlapping area between the first inner electrode patterns and the second inner electrode patterns and to form thin dielectric layers of the inner electrode pattern, thereby allowing for the miniaturizing and high stacking of the multilayer ceramic condenser.

Further, the inner electrode patterns are not formed on a portion of the dielectric layers but are formed to cover the dielectric layers, thereby removing the step of the dielectric layer in the multilayer main body. In addition, the exemplary embodiment of the present invention can reduce thickness deviations in the dielectric layers and can secure the electrical connectivity of the inner electrode patterns, thereby improving the reliability of products.

Moreover, the exemplary embodiment of the present invention can form the multilayer main body and then, form the desired thickness of the side part on the side of the multilayer main body to which the first inner electrode pattern and the second electrode pattern are exposed so as to maximally secure the space occupied by the inner electrode pattern, thereby improving flexibility of product design.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a multilayer ceramic condenser, comprising:
    preparing a plurality of first ceramic green sheets on which a plurality of first stripe-type inner electrode patterns are printed in parallel and a plurality of second ceramic green sheets on which a plurality of second stripe-type inner electrode patterns are printed in parallel;
    forming a laminate by alternately stacking the first green sheets and the second green sheets so that the plurality of first stripe-type inner electrode patterns and the plurality of second stripe-type inner electrode patterns are alternately stacked;
    cutting the laminate into a bar-type laminate to traverse the plurality of first and second stripe-type inner electrode patterns in order to form a second side and a fourth side; and
    forming a first side part and a second side part by applying ceramic slurry to the second side and the fourth side of the bar-type laminate.

2. The method of claim 1, wherein the forming of the laminate includes forming the laminate so that central portions of the first or second stripe-type inner electrode patterns and gap portions formed between the plurality of second or first stripe-type inner electrode patterns disposed on adjacent ceramic green sheets are disposed on a common axis.

3. The method of claim 1, further comprising forming a plurality of multilayer main bodies further including a first side and a third side by cutting the bar-type laminate into chip sized parts in order to include the central portions of the first or second stripe-type inner electrode patterns and the gap portions formed between the plurality of second or first stripe-type inner electrode patterns disposed on adjacent ceramic green sheets before or after the first side part and the second side part are formed.

4. The method of claim 3, further comprising forming a first outer electrode and a second outer electrode on each of the first side and the third side of the multilayer main body.

5. A multilayer ceramic condenser, comprising:
    a multilayer main body in which a plurality of dielectric layers are stacked;
    a first outer electrode and a second outer electrode each formed on opposing first and third sides of the multilayer main body;
    a first inner electrode pattern exposed to the first side and formed in the multilayer main body to cover a dielectric layer to a predetermined interval from the third side;
    a second inner electrode pattern formed in the multilayer main body to be alternately stacked with the first inner electrode pattern, separated therefrom by at least one dielectric layer and exposed to the third side in order to cover the dielectric layer to a predetermined interval from the first side; and
    a first side part and a second side part formed by applying ceramic slurry to each of opposing second and fourth sides to which both the first inner electrode pattern and the second inner electrode pattern are exposed, in the laminate.

6. The multilayer ceramic condenser of claim 5, wherein if a height of the multilayer main body is h1 and a height of a portion in which a step is formed due to the first and second inner electrode patterns formed in the multilayer main body is h2, the h1 and h2 meet the following Equation 1:

$$(h1-h2)/h1 \leq 0.15. \quad \text{Equation 1}$$

7. The multilayer ceramic condenser of claim 5, wherein the thicknesses of the first side part and the second side part are controlled by controlling the amount of ceramic slurry used therefor.

8. The multilayer ceramic condenser of claim 5, wherein the first inner electrode pattern and the second inner electrode pattern are spaced apart from each other and from the third side and the first side by an insulating distance.

9. The multilayer ceramic condenser of claim 5, wherein the first inner electrode pattern and the second inner electrode pattern are each spaced apart from each other and from the third side and the first side by an interval of 20 μm or more.

10. The multilayer ceramic condenser of claim 5, wherein the area of the first inner electrode pattern or the second inner electrode pattern is 90% or more as compared to the area of the dielectric layer.

11. The multilayer ceramic condenser of claim 5, wherein the overlapping area between the first inner electrode pattern and the second inner electrode pattern is 80% or more as compared to the area of the dielectric layer.

* * * * *